United States Patent [19]

Shimada

[11] Patent Number: 5,749,014

[45] Date of Patent: May 5, 1998

[54] SHUTTER DEVICE

[75] Inventor: Fumio Shimada, Saitama-ken, Japan

[73] Assignee: Canon Denshi Kabushiki Kaisha, Saitama-ken, Japan

[21] Appl. No.: 768,337

[22] Filed: Dec. 17, 1996

Related U.S. Application Data

[63] Continuation of Ser. No. 582,189, Jan. 2, 1996, abandoned.

[30] Foreign Application Priority Data

| Jan. 10, 1995 | [JP] | Japan | 7-001983 |
| Jan. 10, 1995 | [JP] | Japan | 7-001984 |
| Jan. 10, 1995 | [JP] | Japan | 7-002002 |

[51] Int. Cl.⁶ ............................................. G03B 9/40
[52] U.S. Cl. ........................ 396/489; 396/484; 396/492
[58] Field of Search ................................ 396/483, 484, 396/489, 491, 492, 463, 465, 466

[56] References Cited

U.S. PATENT DOCUMENTS

| 4,054,891 | 10/1977 | Onda et al. | 354/246 |
| 4,160,592 | 7/1979 | Noack et al. | 354/246 |
| 4,245,905 | 1/1981 | Takayama | 354/246 |
| 4,334,747 | 6/1982 | Shimada et al. | 354/246 |
| 4,487,492 | 12/1984 | Toyoda et al. | 354/246 |

*Primary Examiner*—A. A. Mathews
*Attorney, Agent, or Firm*—Robin, Blecker, Daley & Driscoll

[57] ABSTRACT

A shutter device comprises a shutter blade which operates according to an exposure operation, a first blade driving spring for giving an urging force working in a predetermined direction to the shutter blade substantially over an entire operating range of the shutter blade, a second blade driving spring for giving the shutter blade an urging force working in the same direction as the first blade driving spring, and a charging mechanism for charging the first blade driving spring and the second blade driving spring. Since the charging mechanism includes a first charging member which travels to charge the first blade driving spring and a second charging member which travels to charge the second blade driving spring, the timings of charging the respective springs and the torques required to charge the respective springs can be optimally set.

29 Claims, 8 Drawing Sheets

SHUTTER DEVICE

This is a continuation application under 37 CFR 1.62 of prior application Ser. No. 08/582,189, filed Jan. 2, 1996, now abandoned.

BACKGROUND OF THE INVENTION

1. Field of the Invention

The present invention relates to a shutter device having a mechanical driving mechanism and charging mechanism.

2. Description of the Related Art

In recent years, much development effort has been directed to increasing the curtain speed of a focal plane shutter in order to increase a flash synchronization speed for the purpose of covering a wider variety of photographic conditions as well as in order to increase a maximum shutter speed.

However, since conventional shutters are arranged to drive leading blades and trailing blades by using one spring for each curtain, it is necessary to use springs having strong spring forces to increase the curtain speed, so that it is necessary to increase to a remarkable extent the shutter charging force required to charge such springs.

For this reason, to increase the curtain speed without increasing the spring forces of the springs, it has been proposed to reduce the weight of, and hence the inertial mass of, the shutter blades by using a new composite material, such as carbon fiber, for shutter blades instead of conventional metallic materials.

U.S. Pat. No. 4,487,792 discloses that shutter blades are accelerated by using, only during an initial driving period of a blade driving lever, not only the force of a driving spring for driving the blade driving lever but also the force of a repulsion spring which acts to force an armature away from an electromagnet.

However, the above-described carbon fiber blades need a large number of production steps, such as the step of preparing a lamination of three or more layers for the purpose of avoiding the influence of a curvature, thus resulting in inferior productivity and excessively high cost.

In addition, in the arrangement of the shutter device disclosed in U.S. Pat. No. 4,487,492, the two springs are charged in such a manner that the repulsion spring is charged in an area of the second half of the entire range in which the driving spring is charged. Specifically, since only the driving spring is charged in the first half of the entire charging area and, in the second half thereof, both the driving spring and the repulsion spring are charged at the same time, the force required to charge the springs increases abruptly in the second half of the entire charging area.

In addition, in this arrangement, the peak of a charging force necessarily occurs in the second half. Since this charging force is normally given by a driving part of a camera body, different driving parts must be designed to suit individual shutter devices for various types of camera bodies. This leads to a shutter device of extremely low versatility, and an increase in the charging force leads to even an increase in the entire size of the camera body.

SUMMARY OF THE INVENTION

An object of the present invention is to provide a shutter device which is capable of operating at high speeds without the need to use expensive shutter blades of carbon fiber and also which makes it possible to reduce the force required for spring charging and arbitrarily set a position at which the peak of the force required for spring charging occurs.

To achieve the above-described object, according to one aspect of the present invention, there is provided an arrangement for causing separate members to respectively charge two springs which give urging forces working in the same direction to common shutter blades.

According to another aspect of the present invention, there is provided an arrangement in which the charging areas required to respectively charge two springs which have different operating ranges and give urging forces working in the same direction to common shutter blades are set as substantially equal areas.

The above and other objects, features and advantages of the present invention will become apparent from the following detailed description of a preferred embodiment of the present invention, taken in conjunction with the accompanying drawings.

DETAILED DESCRIPTION OF THE PREFERRED EMBODIMENT

Figure 1:
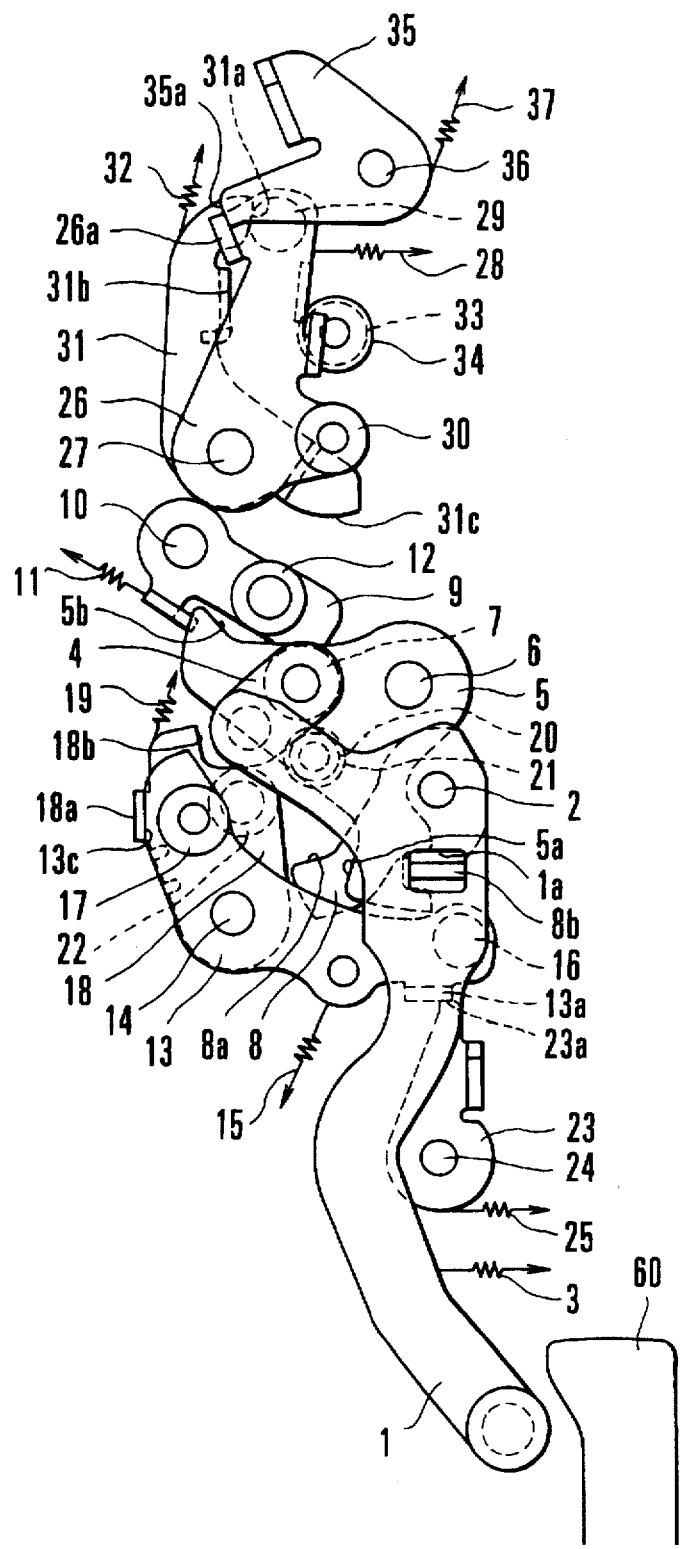
FIG. 1 is a diagrammatic plan view of the essential portion of an embodiment of the present invention, showing the state in which charging is completed.
Figure 2:
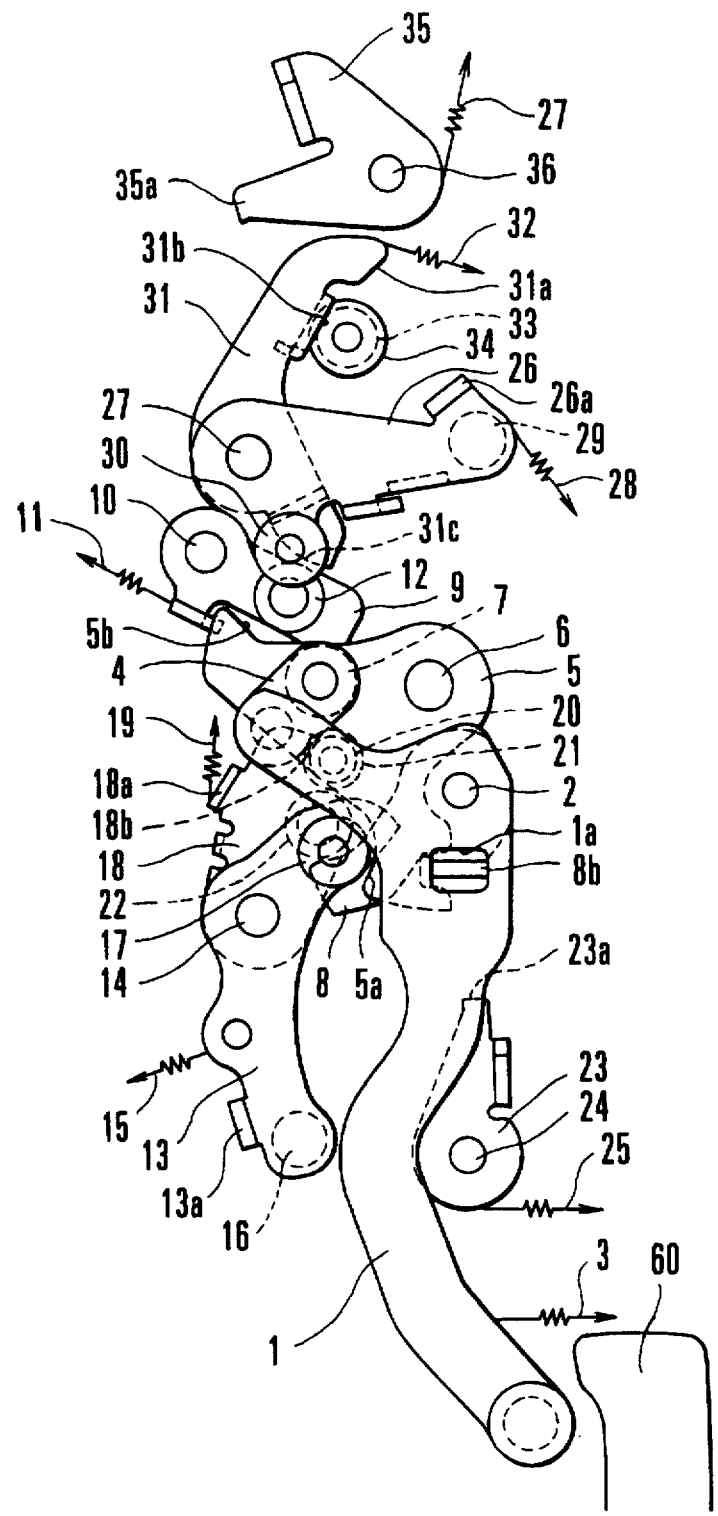
FIG. 2 is a diagrammatic plan view similar to FIG. 1, showing the state in which leading and trailing blades are released (before the start of charging)
Figure 3:
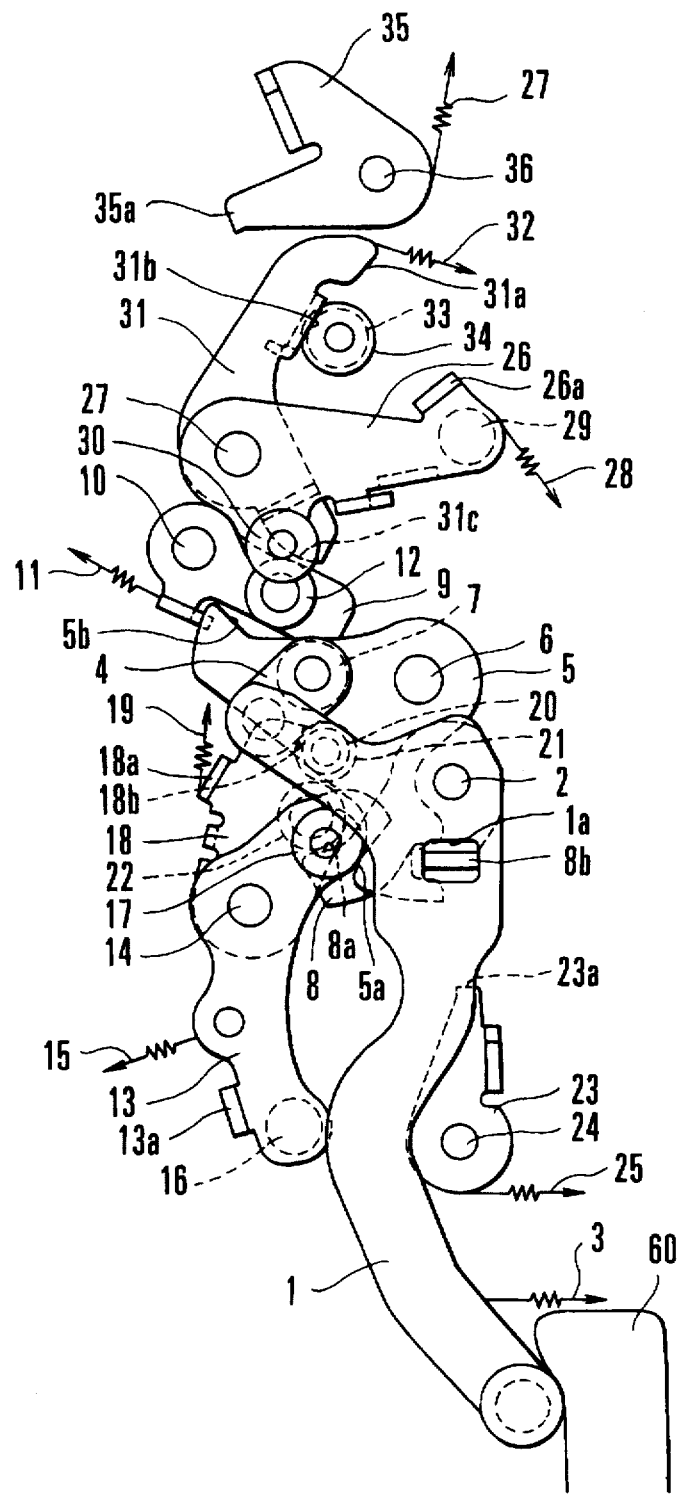
FIG. 3 is a diagrammatic plan view similar to FIG. 1, showing an intermediate state in which charging is being performed.
Figure 4:
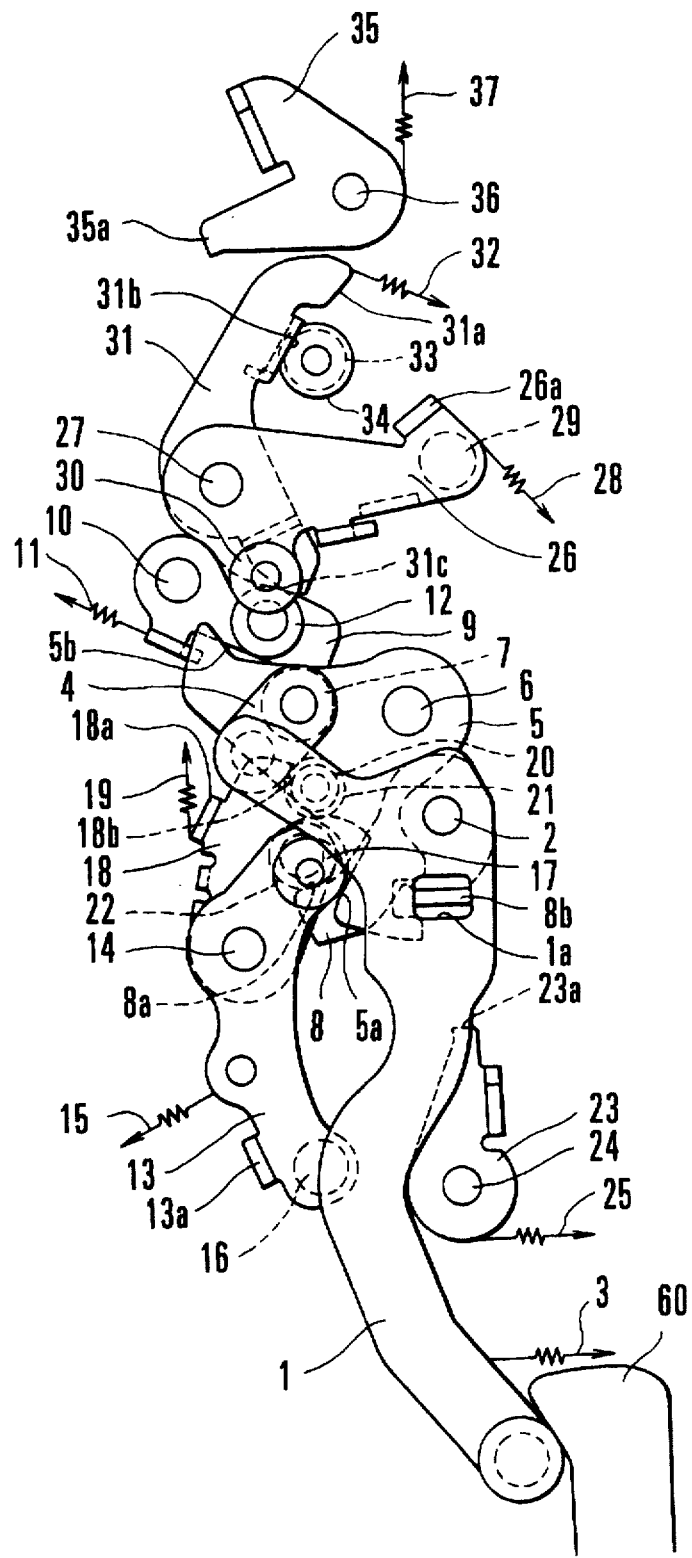
FIG. 4 is a diagrammatic plan view similar to FIG. 1, showing another intermediate state in which charging is being performed.
Figure 5:
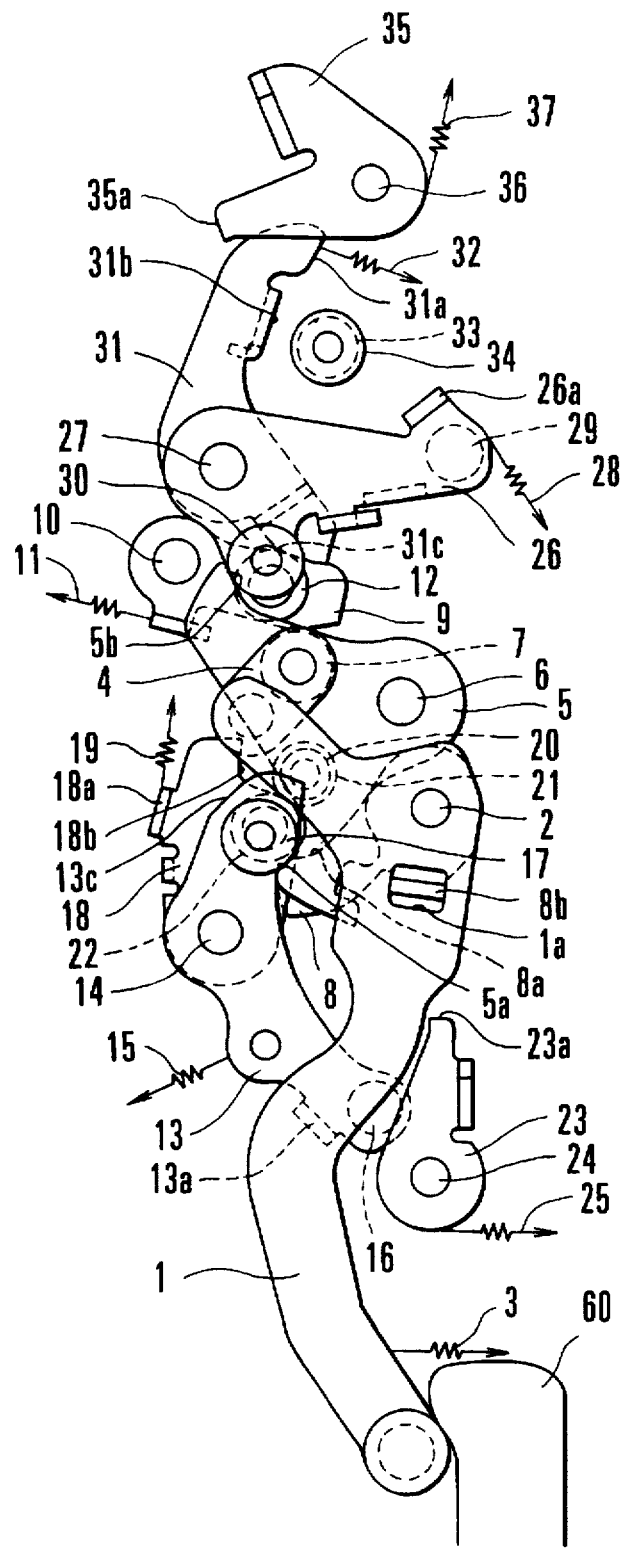
FIG. 5 is a diagrammatic plan view similar to FIG. 1, showing another intermediate state in which charging is being performed.
Figure 6:
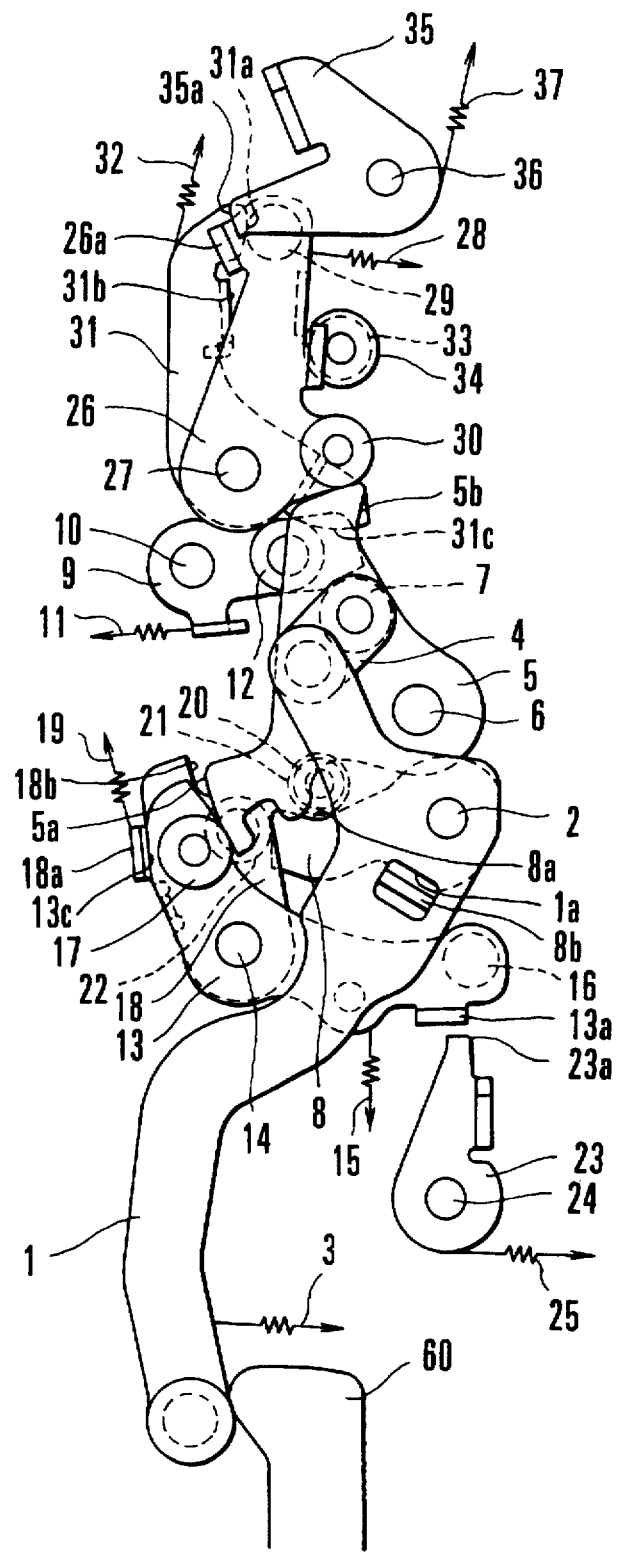
FIG. 6 is a diagrammatic plan view similar to FIG. 1, showing an overcharged state.
Figure 7:
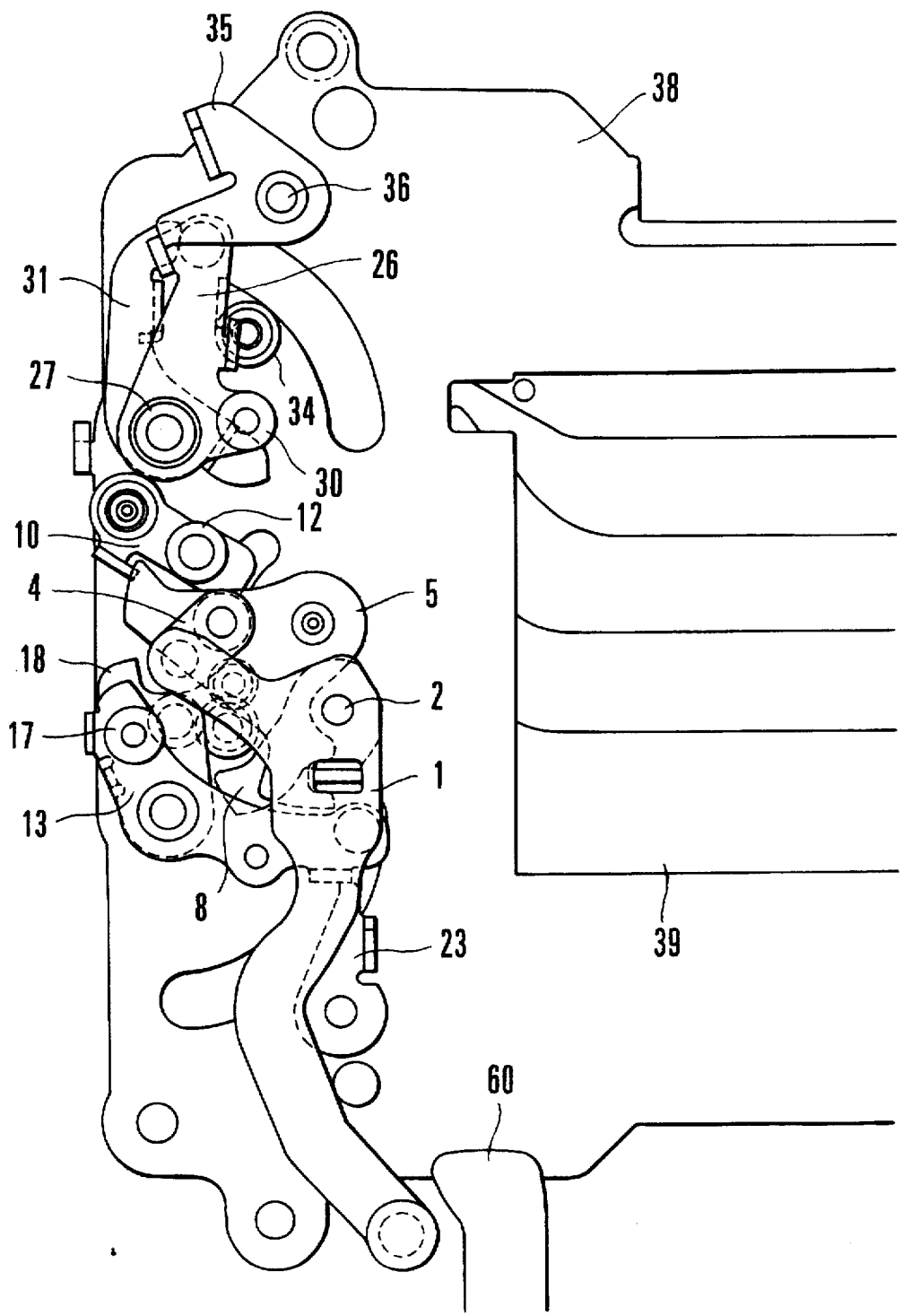
FIG. 7 is a diagrammatic plan view of the essential portion of a shutter device in which the present invention is carried out.
Figure 8:
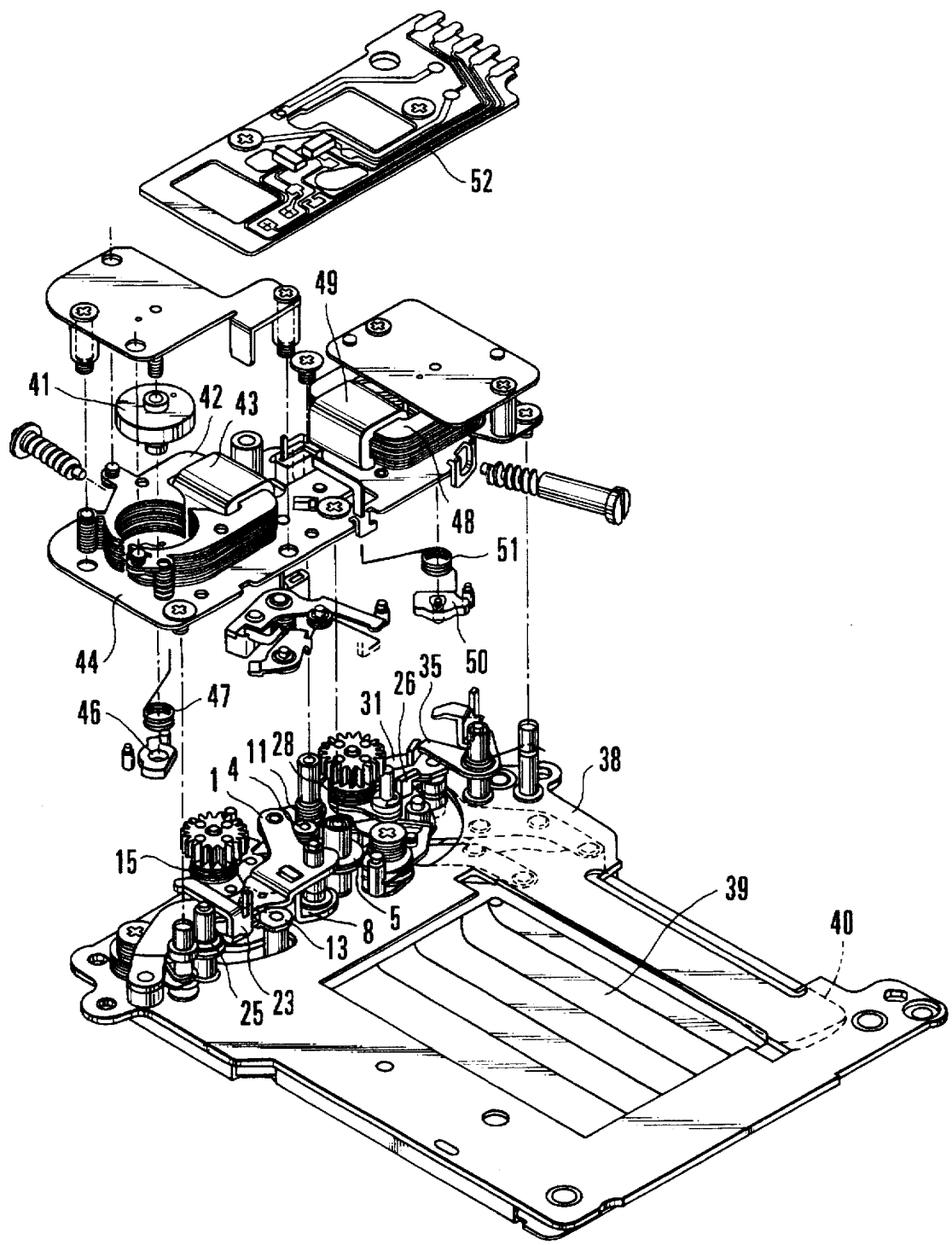
FIG. 8 is a partly exploded, diagrammatic perspective view of the entire shutter device in which the present invention is carried out.

An embodiment of the present invention will be described below with reference to FIGS. 1 to 8. FIG. 1 is a diagrammatic plan view of the essential portion of a mechanism, showing the state in which charging is completed, FIG. 2 is a diagrammatic plan view similar to FIG. 1, showing the state in which leading blades 39 and trailing blades 40 are located in their end-of-exposure positions (before the start of charging), FIGS. 3 to 5 are diagrammatic plan views similar to FIG. 1, showing different intermediate states in which charging is being performed, FIG. 6 is a diagrammatic plan view similar to FIG. 1, showing an overcharged state which follows the completion of charging, FIG. 7 is a diagrammatic top plan view mainly showing the driving part of a shutter device which is placed in a charging-completed state, and FIG. 8 is a partly exploded, diagrammatic perspective view showing the construction of the entire shutter device. As shown in FIGS. 7 and 8, each member is provided on a shutter base plate 38.

As shown in each of FIGS. 1 to 8, a charging lever 1 is driven by a power transmission member 60 provided on a camera body. The charging lever 1 is held turnably about a shaft 2 and is given a counterclockwise urging force by a spring 3. In addition, the charging lever 1 is allowed to turn between the position shown in FIG. 1 and the position shown in FIG. 6, by a stopper (not shown). The charging lever 1 has a connecting hole 1a to allow the charging lever 1 to turn integrally with a leading subsidiary charging lever 8 which will be described later.

A connecting lever 4 is supported turnably with respect to the charging lever 1 and a charging cam lever 5 which will be described later, and turns the charging cam lever 5 in interlocking relationship to the turning of the charging lever 1.

The charging cam lever 5 is held turnably about a shaft 6, and has a cam portion 5a and a cam portion 5b. The cam portion 5a is arranged to come into abutment with a roller 17 of a leading driving lever 13 and charge a leading blade driving spring 15 (which will be described later) when charging the leading driving lever 13 (which will be described later). The cam portion 5b is arranged to come into abutment with a roller 30 of a trailing driving lever 26 and charge a trailing blade driving spring 28 (which will be described later) when charging the trailing driving lever 26. In addition, a connecting roller 7 which abuts against a trailing subsidiary charging lever 9 (which will be described later) is rotatably supported on the charging cam lever 5.

The leading subsidiary charging lever 8 is held turnably about the shaft 2 which is common to the charging lever 1, and has a cam portion 8a which is arranged to charge a leading subsidiary lever 18 (which will be described later) for charging a leading blade auxiliary spring 19 (which will be described later), as well as a connecting portion 8b which allows the leading subsidiary charging lever 8 to turn integrally with the charging lever 1. The connecting portion 8b is fitted into the connecting hole 1a of the charging lever 1.

The trailing subsidiary charging lever 9 is held turnably about a shaft 10, and is given a clockwise urging force by a spring 11 and is at all times forced in abutment with the connecting roller 7. A trailing subsidiary charging lever roller 12 capable of coming into abutment with a trailing subsidiary lever 31 which will be described later is rotatably supported on the trailing subsidiary charging lever 9. The trailing subsidiary charging lever roller 12 comes into abutment with the trailing subsidiary lever 31 to cause a trailing subsidiary lever 31 to travel, whereby a trailing blade auxiliary spring 32 is charged.

The leading driving lever 13 is held turnably about the shaft 14, and is provided with the leading driving lever roller 17 which is capable of coming into abutment with the cam portion 5a of the charging cam lever 5, and an engagement portion 13a to engage with a leading retention lever 23 which will be described later is formed on the leading driving lever 13. The leading driving lever 13 is given a clockwise urging force by the leading blade driving spring 15. In FIG. 1, there is shown the state in which the leading driving lever 13 is engaged with the leading retention lever 23 (which will be described later) and the leading blades 39 cover the aperture of a shutter.

The leading subsidiary lever 18 is turnably supported coaxially to the leading driving lever 13, and is given a clockwise urging force by the leading blade auxiliary spring 19. In the case of the state shown in FIG. 1, an abutment portion 13c of the leading driving lever 13 and an abutment portion 18a of the leading subsidiary lever 18 are kept in abutment with each other, so that the spring force of the leading blade auxiliary spring 19 is applied to the leading driving lever 13 as well. The leading subsidiary lever 18 which turns integrally with the leading driving lever 13 is provided with a stopper portion 18b. A leading stopper 21 which is made from an elastic member formed of rubber, soft plastic or the like is provided on a leading stopper shaft 20, and the stopper portion 18b comes into abutment with the leading stopper 21 and stops the clockwise rotation of the leading subsidiary lever 18.

A leading subsidiary lever roller 22 is rotatably supported on the leading subsidiary lever 18. The leading subsidiary lever roller 22 comes into abutment with the cam portion 8a of the leading subsidiary charging lever 8 and transmits power to the leading subsidiary lever 18.

The leading retention lever 23 is supported turnably about a shaft 24, and is given a counterclockwise urging force by a spring 25. When in the state shown in FIG. 1, the leading retention lever 23 is inhibited from rotating further in the counterclockwise direction, by a stopper which is not shown. An engagement portion 23a comes into abutment with the engagement portion 13a of the leading driving lever 13 and engages with the leading driving lever 13 to inhibit it from rotating in the clockwise direction.

The trailing driving lever 26 is supported turnably about a shaft 27, and is provided with the trailing driving lever roller 30 which comes into abutment with the cam portion 5b of the aforesaid charging cam lever 5. The trailing driving lever 26 has an engagement portion 26a to be brought into engagement with a trailing retention lever 35 which will be described later, and is given a clockwise urging force by the trailing blade driving spring 28. In FIG. 1, there is shown the state in which the trailing driving lever 26 is engaged with the trailing retention lever 35 (which will be described later) and the trailing blades 40 leave the aperture of the shutter fully open.

The trailing subsidiary lever 31 is turnably supported coaxially to the trailing driving lever 26, and is given a clockwise urging force by the trailing blade auxiliary spring 32. In the case of the state shown in FIG. 1, a trailing blade driving pin 29 provided on the trailing driving lever 26 and an abutment portion 31a of the trailing subsidiary lever 31 are kept in abutment with each other, so that the spring force of the trailing blade auxiliary spring 32 is applied to the trailing driving lever 26 as well. The trailing subsidiary lever 31 which turns integrally with the trailing driving lever 26 is provided with a stopper portion 31b which comes into abutment with a trailing stopper 34 provided on a trailing stopper shaft 33, the trailing stopper 34 being made from an elastic member formed of rubber, soft plastic or the like. The trailing subsidiary lever 31 has a charging cam portion 31c. The charging cam portion 31c comes into abutment with the trailing subsidiary charging lever roller 12 which is rotatably supported on the aforesaid trailing subsidiary charging lever 9, whereby the trailing subsidiary lever 31 is charged by the counterclockwise rotating motion of the trailing subsidiary charging lever 9.

The trailing retention lever 35 is supported turnably about a shaft 36, and is given a counterclockwise urging force by a spring 37. When in the state shown in FIG. 1, the trailing retention lever 35 is inhibited from rotating further in the counterclockwise direction, by a stopper which is not shown. An engagement portion 35a comes into abutment with an engagement portion 26a of the trailing driving lever 26 and engages with the trailing driving lever 26 to inhibit it from rotating in the clockwise direction.

Referring to FIG. 8, a leading blade rotor 41 is magnetized and a leading blade hammer 46 which comes into abutment with the leading retention lever 23 is attached to the rotational shaft of the rotor 41. A leading blade stator 42 is provided on a base member 44, and a leading blade coil 43 is wound around part of the stator 42.

A return spring 47 urges the leading blade rotor 41 and the leading blade hammer 46 in their predetermined directions.

While the above-described electromagnetic driving device serves to start the running of the leading blades 39, the running of the trailing blades 40 is started by a similar operation being performed by a trailing blade rotor (not shown), a trailing blade stator 48, a trailing blade coil 49, a return spring 51, and a trailing blade hammer 50 which comes into abutment with the trailing retention lever 35.

A printed circuit board 52 is connected to the leading blade coil 43 and the trailing blade coil 49 so that these coils 43 and 49 are energized by the supply of electricity from the camera body.

When a release operation is performed and the leading blade coil 43 is energized by the supply of electricity from the camera body, a magnetic field is generated in the leading blade stator 42, so that the leading blade rotor 41 rotates against the urging force of the return spring 47. The rotation of the leading blade rotor 41 brings the leading blade hammer 46 into abutment with the leading retention lever 23, thereby causing the leading retention lever 23 to travel. Thus, the retention of the leading driving lever 13 is released and the running of the leading blades 39 is started by the spring forces of the leading blade driving spring 15 and the leading blade auxiliary spring 19.

If the supply of electricity from the camera body is stopped to de-energize the leading blade coil 43, the leading blade rotor 41 and the leading blade hammer 46 are returned to their predetermined positions by the urging force of the return spring 47.

When a predetermined period of time passes after the start of the running of the leading blades 39, the trailing blade coil 49 is energized and the trailing blade rotor (not shown) rotates to bring the trailing blade hammer 50 into abutment with the trailing retention lever 35, thereby causing the trailing retention lever 35 to travel. Thus, the retention of the trailing driving lever 26 is released and the running of the trailing blades 40 is started by the spring forces of the trailing blade driving spring 28 and the trailing blade auxiliary spring 32.

In this manner, such plurality of electromagnetic driving devices respectively cause the leading blades 39 and the trailing blades 40 to independently perform the release operation of the shutter device.

The operation of the above-described arrangement will be described below. When the shutter device is in the photography-enabled standby state shown in FIG. 1, the leading blade coil 43 and the trailing blade coil 49 of the electromagnetic driving devices are respectively energized at optimum timings by the supply of electricity from the camera body, whereby the leading blade hammer 46 and the trailing blade hammer 50 are respectively rotated to cause the leading retention lever 23 and the trailing retention lever 35 to turn in the respective clockwise directions. When the leading retention lever 23 and the trailing retention lever 35 are sequentially disengaged from the leading driving lever 13 and the trailing driving lever 26, first, the leading driving lever 13 and the leading subsidiary lever 18 are integrally driven by the urging forces of the leading blade driving spring 15 and the leading blade auxiliary spring 19 to cause the leading blades 39 to travel from their closed position to their open position via a leading blade driving pin 16. At an intermediate time during the aforesaid operation, the stopper portion 18b of the leading subsidiary lever 18 comes into abutment with the leading stopper 21 to damp noise and shock, and finally comes into abutment with the leading stopper shaft 20 to accurately determine the operating range of the leading blade auxiliary spring 19 and cancel the urging force of the leading blade auxiliary spring 19 which works on the leading driving lever 13. Thus, the leading driving lever 13 is driven by only the leading blade driving spring 15 to come into abutment with a stopper (not shown) provided for determining the open position.

Then, the trailing driving lever 26 and the trailing subsidiary lever 31 are integrally driven by the urging forces of the trailing blade driving spring 28 and the trailing blade auxiliary spring 32 to cause the trailing blades 40 to travel from their open position to their closed position via the trailing blade driving pin 29. At an intermediate time during the aforesaid operation, the stopper portion 31b of the trailing subsidiary lever 31 comes into abutment with the trailing stopper 34 to damp noise and shock, and finally comes into abutment with the trailing stopper shaft 33 to accurately determine the operating range of the trailing blade auxiliary spring 32 and cancel the urging force of the trailing blade auxiliary spring 32 which works on the trailing driving lever 26. Thus, the trailing driving lever 26 is driven by only the trailing blade driving spring 28 to come into abutment with a stopper (not shown) provided for determining the closed position, whereby an exposure operation (photographing operation) is completed and the shutter device is brought into the state shown in FIG. 2.

When the charging lever 1 is turned in the clockwise direction to change the shutter device from the state of FIG. 2 to the photography-enabled standby state, the charging cam lever 5 is also turned in the clockwise direction via the connecting lever 4. By the clockwise turning of the charging cam lever 5, the cam portion 5a is brought into abutment with the leading driving lever roller 17 to cause the leading driving lever 13 to turn in the counterclockwise direction. Thus, the leading blade driving spring 15 starts to be charged and the leading blades 39 start to travel toward the closed position (the state shown in FIG. 3).

When the charging lever 1 is turned to a slight extent in the state shown in FIG. 3, the leading subsidiary charging lever 8 integrally connected to the charging lever 1 turns in the clockwise direction to bring the cam portion 8a into abutment with the leading subsidiary lever roller 22, thereby causing the leading subsidiary lever 18 to turn in the counterclockwise direction. By the counterclockwise turning of the leading subsidiary lever 18, the leading blade auxiliary spring 19 starts to be charged.

Substantially simultaneously, the trailing subsidiary charging lever 9 kept in abutment with the connecting roller 7 is turned in the counterclockwise direction. The trailing subsidiary charging lever roller 12 provided on the trailing subsidiary charging lever 9 comes into abutment with the charging cam portion 31c to cause the trailing subsidiary lever 31 to start to turn in the counterclockwise direction. Thus, the trailing blade auxiliary spring 32 starts to be charged.

Specifically, the leading blade driving spring 15, the leading blade auxiliary spring 19 and the trailing blade auxiliary spring 32 substantially simultaneously start to be charged (the state shown in FIG. 4).

When the charging lever 1 is turned to a further extent the cam portion 5b of the charging cam lever 5 is brought into abutment with the trailing driving lever roller 30 provided on the trailing driving lever 26, thereby causing the trailing driving lever 26 to turning in the counterclockwise direction. By the counterclockwise turn of the trailing driving lever 26, the trailing blade driving spring 28 starts to be charged (the state shown in FIG. 5).

It is to be noted that since the present embodiment is arranged to return the leading blades 39 and the trailing blades 40 to their photography-ready positions with the leading blades 39 and the trailing blades 40 overlapping each other to prevent incorrect exposure during a charging operation, the trailing driving lever 26 starts to turn after the leading driving lever 13 has started to turn. Therefore, the trailing blade driving spring 28 starts to be charged after the start of charging of the leading blade driving spring 15, the leading blade auxiliary spring 19 and the trailing blade auxiliary spring 32.

FIG. 6 shows the overcharged state in which the charging lever 1 is brought in abutment with a stopper (not shown) and turned in the clockwise direction to a greatest extent. In the process of the change from the state of FIG. 5 to the state of FIG. 6, the engagement portion 13a of the leading driving lever 13 moves over the engagement portion 23a of the leading retention lever 23.

Meanwhile, the engagement portion 26a of the trailing driving lever 26 also moves over the engagement portion 35a of the trailing retention lever 35. Accordingly, even if the clockwise turning of the charging lever 1 is cancelled, the leading driving lever 13 and the trailing driving lever 26 are respectively placed in the state of being turnable in the clockwise directions.

After that, when the clockwise turning of the charging lever 1 is cancelled, the charging lever 1 turns in the counterclockwise direction together with the charging cam lever 5 and the leading subsidiary charging lever 8 via the connecting lever 4 by the spring force of the spring 3, while the spring 11 causes the trailing subsidiary charging lever 9 to turn in the clockwise direction. Thus, the shutter device returns to the state of FIG. 1 in which charging is completed.

At this time, when the leading driving lever 13 is brought into engagement with the leading retention lever 23, the abutment portion 18a of the leading subsidiary lever 18 is brought into abutment with the abutment portion 13c by the urging force of the leading blade auxiliary spring 19, whereby the leading subsidiary lever 18 is brought into engagement with the leading driving lever 13.

Meanwhile, when the trailing driving lever 26 is brought into engagement with the trailing retention lever 35, the abutment portion 31a of the trailing subsidiary lever 31 is brought into abutment with the trailing blade driving pin 29 of the trailing driving lever 26 by the urging force of the trailing blade auxiliary spring 32, whereby the trailing subsidiary lever 31 is brought into engagement with the trailing driving lever 26.

As described above, according to the present embodiment, in the arrangement in which the leading blades 39 are driven by the leading blade driving spring 15 and the leading blade auxiliary spring 19 and the trailing blades 40 are driven by the trailing blade driving spring 28 and the trailing blade auxiliary spring 32, the urging forces of the leading blade auxiliary spring 19 and the trailing blade auxiliary spring 32 respectively work on the leading blades 39 and the trailing blades 40 during only their initial driving periods. Accordingly, when the leading blades 39 and the trailing blades 40 start to run, they can be made to reach a desired curtain speed within a short time by using strong spring forces (the leading blade driving spring 15+the leading blade auxiliary spring 19 and the trailing blade driving spring 28+the trailing blade auxiliary spring 32). In addition, after the predetermined curtain speed has been reached, since an inertia force also works, the curtain speed can be maintained even by comparatively weak spring forces (the leading blade driving spring 15 and the trailing blade driving spring 28) without the need for a large acceleration.

The aforesaid arrangement is also preferable in that the curtain speed can be maintained at a constant speed. In addition, the leading blades 39 and the trailing blades 40 can be reduced in speed and stopped by a small force compared to an arrangement in which the leading curtain blades and the trailing curtain blades are driven by one spring per curtain.

In addition, the leading blade auxiliary spring 19 which has a larger spring force than the leading blade driving spring 15 and the trailing blade auxiliary spring 32 which has a larger spring force than the trailing blade driving spring 28 can be charged by using an area larger than the operating area required for an exposure operation, whereby the energy required for such charging can be distributed and the maximum value of the force required for the charging can be lowered.

In addition, since the leading blade auxiliary spring 19 and the trailing blade auxiliary spring 32 are charged by using substantially the entire the charging area of the leading blade driving spring 15, the maximum value of the total charging force required to charge all the springs can be lowered, whereby the total charging force within the charging area can be made uniform. Incidentally, good acceleration performance can be obtained by setting the operating angle of the leading subsidiary lever 18 (the leading blade auxiliary spring 19) and that of the trailing subsidiary lever 31 (the trailing blade auxiliary spring 32) so as to inhibit the urging force of the leading blade auxiliary spring 19 and that of the trailing blade auxiliary spring 32 from working within the range of 15° to 45° from the respective positions at which the leading subsidiary lever 18 and the trailing subsidiary lever 31 are retained by engagement. However, the leading blade auxiliary spring 19 and the trailing blade auxiliary spring 32 may be arranged so that their urging forces can work over the entire shutter operation range.

Although in the present embodiment the charging lever 1 causes the charging cam lever 5 to turn in the clockwise direction via the connecting lever 4, the charging cam lever 5 may also be directly turned in the clockwise direction by a member for charging the drive of a mirror unit or the like.

Although the present embodiment has been described above with reference to the example in which the start of charging of the leading blade driving spring 15 slightly precedes the start of charging of the leading blade auxiliary spring 19, this example is not intended to limit the present invention. For example, if an arrangement capable of simultaneously starting to charge the leading blade driving spring 15 and the leading blade auxiliary spring 19 is adopted, the required charging torque can be uniformly distributed within their charging areas, so that the efficiency of charging of the springs 15 and 19 can be improved to a further extent.

In contrast, even in the case of an arrangement in which the charging of the leading blade auxiliary spring 19 is started prior to the charging of the leading blade driving spring 15, a satisfactory effect can be achieved as far as the charging area of the leading blade auxiliary spring 19 is substantially equal to that of the leading blade driving spring 15.

In addition, the leading subsidiary charging lever 8 or the trailing subsidiary charging lever 9 may be omitted and the leading blade auxiliary spring 19 or the trailing blade auxiliary spring 32 may be charged via the leading driving lever 13 or the trailing driving lever 26.

As described above, it is possible to independently set the timing of starting charging of a driving spring and the timing of starting charging of an auxiliary spring for applying an urging force in the same direction as the driving spring, so that it is possible to arbitrarily set a position at which to produce the peak of the force required for spring charging.

Specifically, since the spring-charging characteristics can be set to suit the output characteristics of a driving part of a camera body, it is possible to provide a shutter device of improved versatility.

In addition, it is possible to readily set a charging cam lever and a leading subsidiary charging lever so that they are made to travel by different amounts. It is also possible to readily set the timing of starting rotation of the leading subsidiary charging lever with respect to the timing of starting rotation of the charging cam lever.

Since the charging cam lever and a leading driving lever as well as the leading subsidiary charging lever and a leading subsidiary lever are brought into abutment with each other by using the abutment between a cam and a roller, it is possible to reduce the amount of turning required for the charging cam lever to charge the driving spring as well as the amount of turning required for the leading subsidiary charging lever to charge the auxiliary lever. Accordingly, it is possible to provide a shutter device of reduced size.

Further, shutter blades can be made to run at high speeds since they are given an urging force by two springs, i.e., the driving spring and the auxiliary spring. In addition, since the auxiliary spring having a smaller operating range than the driving spring is charged by the amount of charging operation which is approximately equal to the amount of charging operation of the driving spring, the force required to charge the auxiliary spring can be uniformly distributed in the amount of charging operation required to charge the driving spring. Accordingly, since the charging force necessary for the amount of charging operation required to charge the driving spring and the auxiliary spring becomes an approximately uniform force, the two springs having different operating ranges can be efficiently charged even with a small force.

The range in which the auxiliary spring gives an urging force to the shutter blades is set in the area of the first half of the exposure operation range of the shutter blades. Accordingly, since the urging force of each of the driving spring and the auxiliary spring is simultaneously given to the shutter blades in that area, it is possible to increase an initial velocity which is particularly important to high-speed shutters.

What is claimed is:

1. A shutter device comprising:
   a) a shutter blade which operates according to an exposure operation;
   b) a first blade driving spring for giving an urging force working in a predetermined direction to said shutter blade in operating range of said shutter blade;
   c) a second blade driving spring for giving said shutter blade an urging force working in the same direction as said first blade driving spring; and
   d) a charging mechanism for charging said first blade driving spring and said second blade driving spring,
   wherein said charging mechanism includes a first charging member which travels to charge said first blade driving spring and a second charging member which travels to charge said second blade driving spring.

2. A shutter device according to claim 1, wherein said first charging member rotates to charge said first blade driving spring, while said second charging member rotates to charge said second blade driving spring, a rotational center position of said first charging member being different from a rotational center position of said second charging member.

3. A shutter device according to claim 1, wherein said first blade driving spring gives an urging force to a first blade driving member for driving said shutter blade and is charged by said first blade driving member being made to travel by a travel of said first charging member, while said second blade driving spring gives an urging force to a second blade driving member for driving said shutter blade and is charged by said second blade driving member being made to travel by a travel of said second charging member.

4. A shutter device according to claim 3, wherein an abutment between said first charging member and said first blade driving member is provided by a roller and a cam portion capable of coming into abutment with said roller, while an abutment between said second charging member and said second blade driving member is provided by a roller and a cam portion capable of coming into abutment with said roller.

5. A shutter device according to claim 3, wherein said first charging member has a first cam portion formed thereon and said first blade driving member is provided with a roller capable of coming into abutment with said first cam portion, while said second charging member has a second cam portion formed thereon and said second blade driving member is provided with a roller capable of coming into abutment with said second cam portion.

6. A shutter device according to claim 4, wherein said first charging member has a first cam portion formed thereon said first blade driving member is provided with a roller capable of coming into abutment with said first cam portion, while said second charging member has a second cam portion formed thereon and said second blade driving member is provided with a roller capable of coming into abutment with said second cam portion.

7. A shutter device comprising:
   a) a shutter blade:
   b) a first blade driving member for driving said shutter blade according to an exposure operation;
   c) a first blade driving spring for giving an urging force to said first blade driving member;
   d) a second blade driving member for driving said shutter blade in the same direction as said first blade driving member by travelling together with said first blade driving member according to the exposure operation, said second blade driving member having a smaller operating range than said first blade driving member;
   e) a second blade driving spring for giving an urging force to said second blade driving member; and
   f) a charging mechanism for charging said first blade driving spring and said second blade driving spring by causing said first blade driving member and said second blade driving member to travel respectively toward positions at which to locate said first blade driving member and said second blade driving member before exposure,
   wherein said charging mechanism includes: a first charging member which travels to cause said first blade driving member to travel toward the position at which to locate said first blade driving member before exposure; and a second charging member which travels to cause said second blade driving member to travel toward the position at which to locate said second blade driving member before exposure.

8. A shutter device according to claim 7, wherein said first charging member rotates to cause said first blade driving member to travel toward the position at which to locate said first blade driving member before exposure, while said second blade driving member rotates to cause said second blade driving member to travel toward the position at which to locate said second blade driving member before exposure, a rotational center position of said first charging member being different from a rotational center position of said second charging member.

9. A shutter device comprising:
   a) a shutter blade which operates according to an exposure operation;
   b) a first blade driving spring for giving an urging force working in a predetermined direction to said shutter blade in operating range of said shutter blade;
   c) a second blade driving spring for giving an urging force working in the same direction as said first blade driving spring to said shutter blade in a predetermined range which is small compared to said first blade driving spring; and
   d) a charging mechanism for charging said first blade driving spring and said second blade driving spring after the exposure operation,
   wherein said charging mechanism charges said first blade driving spring and said second blade driving spring by respective amounts of charging operation which are approximately equal to each other.

10. A shutter device according to claim 9, wherein said predetermined range in which said second blade driving spring gives the urging force to said shutter blade is set in an area of a first half of an exposure operation range of said shutter blade, and said shutter blade is given the respective urging forces of said first blade driving spring and said second blade driving spring at the same time in said predetermined range.

11. A shutter device according to claim 9, wherein said first blade driving spring and said second blade driving spring simultaneously start to be charged.

12. A shutter device according to claim 10, wherein said first blade driving spring and said second blade driving spring simultaneously start to be charged.

13. A shutter device comprising:
   a) a shutter blade;
   b) a first blade driving member for driving said shutter blade according to an exposure operation;
   c) a first blade driving spring for giving an urging force to said first blade driving member;
   d) a second blade driving member for driving said shutter blade by travelling together with said first blade driving member according to the exposure operation, said second blade driving member having a smaller operating range than said first blade driving member;
   e) a second blade driving spring for giving an urging force to said second blade driving member; and
   f) a charging mechanism for charging said first blade driving spring and said second blade driving spring by causing said first blade driving member and said second blade driving member to travel respectively toward positions at which to locate said first blade driving member and said second blade driving member before exposure,
   wherein a travelling range in which both said first blade driving member and said second blade driving member travel during charging by said charging mechanism is larger than a travelling range in which both said first blade driving member and said second blade driving member travel during the exposure operation.

14. A shutter device according to claim 13, wherein said charging mechanism causes said first blade driving member and said second blade driving member substantially simultaneously to start to travel respectively toward positions at which to locate said first blade driving member and said second blade driving member before exposure.

15. A shutter device according to claim 13, wherein said charging mechanism includes: a first charging member which turns to cause said first blade driving member to travel toward the position at which to locate said first blade driving member before exposure; and a second charging member which turns to cause said second blade driving member to travel toward the position at which to locate said second blade driving member before exposure, a rotational center position of said first charging member being different from a rotational center position of said second charging member.

16. A shutter device according to claim 14, wherein said charging mechanism includes: a first charging member which turns to cause said first blade driving member to travel toward the position at which to locate said first blade driving member before exposure; and a second charging member which turns to cause said second blade driving member to travel toward the position at which to locate said second blade driving member before exposure, a rotational center position of said first charging member being different from a rotational center position of said second charging member.

17. A shutter device according to claim 15, wherein an abutment between said first charging member and said first blade driving member is provided by a roller and a cam portion capable of coming into abutment with said roller, while an abutment between said second charging member and said second blade driving member is provided by a roller and a cam portion capable of coming into abutment with said roller.

18. A shutter device according to claim 15, wherein said first blade driving member is provided with a first roller and said first charging member is provided with a first cam portion capable of coming into abutment with said first roller, while said second blade driving member is provided with a second roller and said second charging member is provided with a second cam portion capable of coming into abutment with said second roller.

19. A shutter device comprising:
   a) a leading blade operative to change from its light-blocking state to its open state according to an exposure operation;
   b) a first leading blade driving member for driving said leading blade;
   c) a first blade driving spring for giving said first leading blade driving member an urging force working in a direction in which said leading blade is changed to the open state;
   d) a trailing blade operative to change from its open state to its light-blocking state according to an exposure operation;
   e) a first trailing blade driving member for driving said trailing blade;
   f) a first trailing blade driving spring for giving said first trailing blade driving member an urging force working in a direction in which said trailing blade is changed to the light-blocking state;

g) a second trailing blade driving member for driving said trailing blade together with said first trailing blade driving member;

h) a second trailing blade driving spring for giving said second trailing blade driving member an urging force working in the same direction as said first trailing blade driving spring; and i) a charging mechanism for charging said first leading blade driving spring, said first trailing blade driving spring and said second trailing blade driving spring by causing said first leading blade driving member, said first trailing blade driving member and said second trailing blade driving member to travel respectively toward positions at which to locate said first leading blade driving member, said first trailing blade driving member and said second trailing blade driving member before exposure, wherein said charging mechanism causes said first trailing blade driving member to start to travel later than said first leading blade driving member and said second trailing blade driving member toward the position at which to locate said first trailing blade driving member before exposure.

20. A shutter device according to claim 19, wherein said charging mechanism causes said first leading blade driving member and said second trailing blade driving member substantially simultaneously to travel respectively toward the positions at which to locate said first leading blade driving member and said second trailing blade driving member before exposure.

21. A shutter device according to claim 19, wherein a spring force of said second trailing blade driving spring is larger than a spring force of said first trailing blade driving spring.

22. A shutter device according to claim 19, further comprising a second leading blade driving member for driving said leading blade together with said first leading blade driving member, and a second leading blade driving spring for giving said second leading blade driving member an urging force working in the same direction as said first leading blade driving spring.

23. A shutter device according to claim 20, wherein a spring force of said second trailing blade driving spring is larger than a spring force of said first trailing blade driving spring.

24. A shutter device according to claim 19, wherein said charging mechanism includes: a first charging member for charging said first leading blade driving spring and said first trailing blade driving spring by causing said first leading blade driving member and said first trailing blade driving member to travel respectively toward positions at which to locate said first leading blade driving member and said first trailing blade driving member before exposure; and a second charging member for charging said second trailing blade driving spring by causing said second trailing blade driving member to travel toward the position at which to locate said second trailing blade driving member before exposure.

25. A shutter device according to claim 20, wherein said charging mechanism includes: a first charging member for charging said first leading blade driving spring and said first trailing blade driving spring by causing said first leading blade driving member and said first trailing blade driving member to travel respectively toward positions at which to locate said first leading blade driving member and said first trailing blade driving member before exposure; and a second charging member for charging said second trailing blade driving spring by causing said second trailing blade driving member to travel toward the position at which to locate said second trailing blade driving member before exposure.

26. A shutter device according to claim 24, wherein said first charging member and said second charging member respectively rotate about different rotational centers.

27. A shutter device according to claim 24, wherein an abutment between said first charging member and said first leading blade driving member as well as said first trailing blade driving member is provided by a roller and a cam portion capable of coming into abutment with said roller, while an abutment between said second charging member and said second trailing blade driving member is provided by a roller and a cam portion capable of coming into abutment with said roller.

28. A shutter device according to claim 24, wherein said first leading blade driving member and said first trailing blade driving member respectively have a first roller and a second roller, and said first charging member has a first cam portion capable of coming into abutment with said first roller and a second cam portion capable of coming into abutment with said second roller; and wherein, during charging, said first cam portion comes into abutment with said first roller to cause said first leading blade driving member to travel toward the position at which to locate said first leading blade driving member before exposure, while said second cam portion comes into abutment with said second roller to cause said first trailing blade driving member to travel toward the position at which to locate said first trailing blade driving member before exposure.

29. A shutter device according to claim 28, wherein said second trailing blade driving member is provided with a third cam portion and said second charging member is provided with a third roller capable of coming into abutment with said third cam portion; and wherein, during charging, said third roller comes into abutment with said third cam portion to cause said second trailing blade driving member to travel toward the position at which to locate said second trailing blade driving member before exposure.

* * * * *

UNITED STATES PATENT AND TRADEMARK OFFICE
CERTIFICATE OF CORRECTION

PATENT NO. : 5,749,014
DATED : May 5, 1998
INVENTOR(S) : Shimada

It is certified that error appears in the above-identified patent and that said Letters Patent is hereby corrected as shown below:

Col. 1, line 31, delete "4,487,792" and insert -- 4,487,492 --.

Col. 7, line 3, delete "turn" and insert -- turning --.

Col. 8, line 26, delete "the" (second occurrence)

Signed and Sealed this

First Day of December, 1998

*Attest:*

BRUCE LEHMAN

*Attesting Officer*     *Commissioner of Patents and Trademarks*